(12) United States Patent
Sheppard

(10) Patent No.: US 8,066,197 B2
(45) Date of Patent: Nov. 29, 2011

(54) FAILSAFE THERMAL BYPASS VALVE FOR COOLING SYSTEM

(75) Inventor: Jeffrey Owen Sheppard, Milton (CA)

(73) Assignee: Dana Canada Corporation, Oakville, Ontario (CA)

( * ) Notice: Subject to any disclaimer, the term of this patent is extended or adjusted under 35 U.S.C. 154(b) by 525 days.

(21) Appl. No.: 12/354,277

(22) Filed: Jan. 15, 2009

(65) Prior Publication Data

US 2010/0175640 A1  Jul. 15, 2010

(51) Int. Cl.
  *G05D 23/08* (2006.01)
  *G05D 23/00* (2006.01)
  *F01P 7/02* (2006.01)
  *F01P 7/14* (2006.01)
(52) U.S. Cl. ............ 236/93 R; 236/34.5; 165/297; 123/41.09
(58) Field of Classification Search ............ 236/93 R, 236/34, 34.5, 99 R, 101 R; 123/41.1, 41.09; 251/337; 165/103, 283, 297; 137/468, 625
See application file for complete search history.

(56) References Cited

U.S. PATENT DOCUMENTS

| | | | |
|---|---|---|---|
| 4,883,082 A | 11/1989 | Pirkle | |
| 6,117,312 A | 9/2000 | Mees et al. | |
| 6,253,837 B1 | 7/2001 | Seiler et al. | |
| 6,499,666 B1 | 12/2002 | Brown | |
| 6,695,217 B2 | 2/2004 | Leu et al. | |
| 6,719,208 B2 | 4/2004 | Brown | |
| 6,935,569 B2 | 8/2005 | Brown et al. | |
| 7,299,994 B2 | 11/2007 | Brown et al. | |
| 2006/0108435 A1 | 5/2006 | Kozdras et al. | |

*Primary Examiner* — Chen Wen Jiang
(74) *Attorney, Agent, or Firm* — Ridout & Maybee LLP

(57) ABSTRACT

A thermal bypass valve for a heat exchanger circuit includes a valve housing forming a valve chamber including a bypass passage and ports for the flow of heat exchange fluid into and out of the valve chamber as well as a bypass port defined by a valve seat. Two axially aligned thermally sensitive actuators are mounted in the chamber, each with an actuator body and its own movable piston extendible from one end of the body. One of these pistons operably engages the actuatory body associated with the other piston. Each actuator body is normally movable in the chamber in response to extension of its piston. One of the actuators extends its piston at a higher temperature than the temperature required for the other actuator to extend its piston. A bypass valve member is mounted on one of the actuators and can be moved by either actuator from an open position to a closed position.

25 Claims, 16 Drawing Sheets

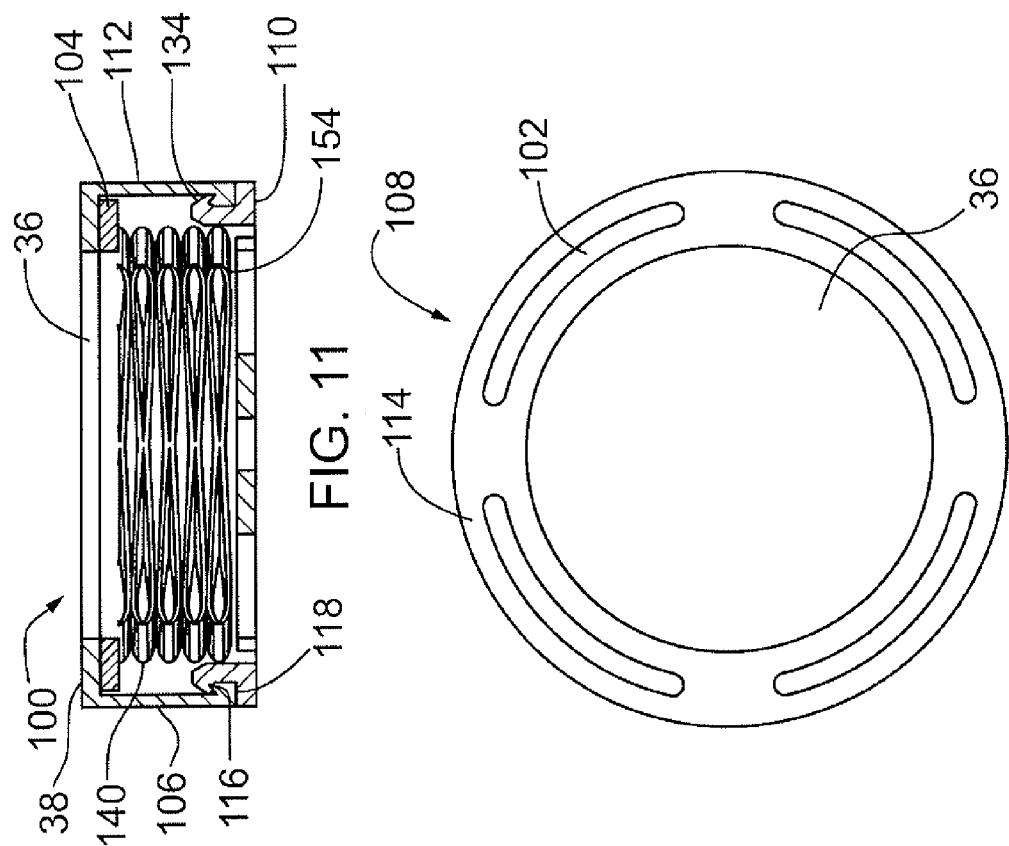
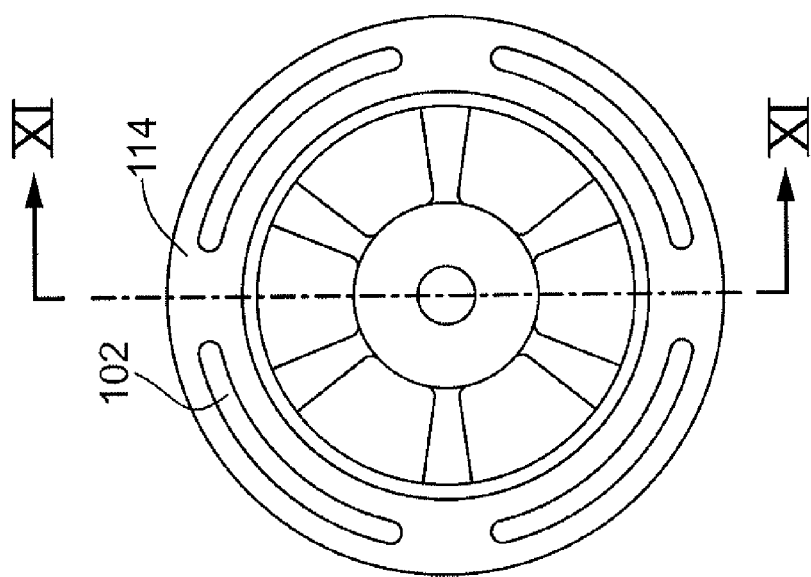

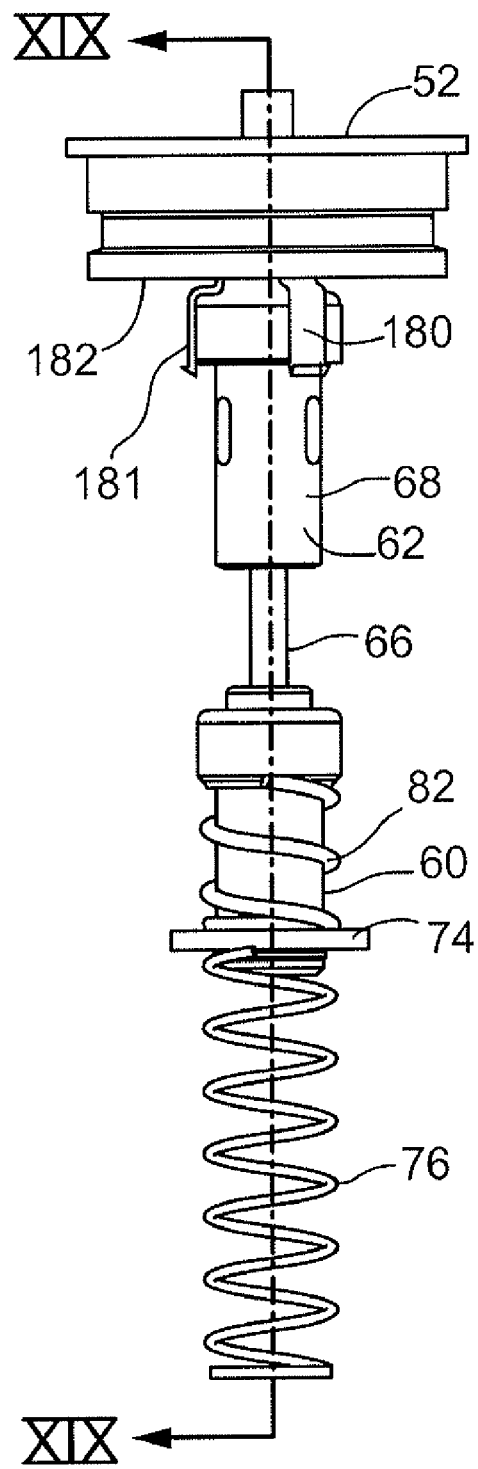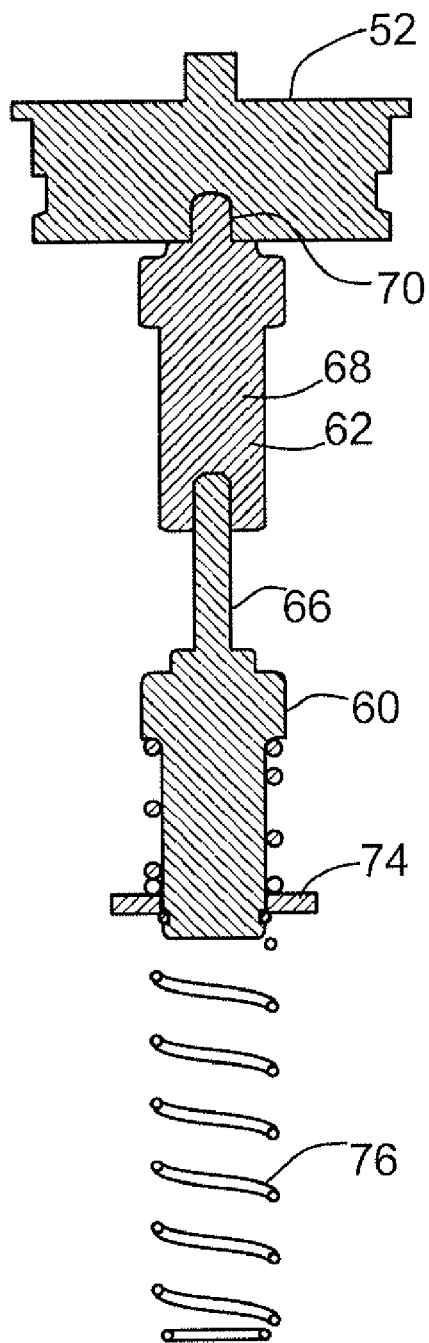
FIG. 18
FIG. 19

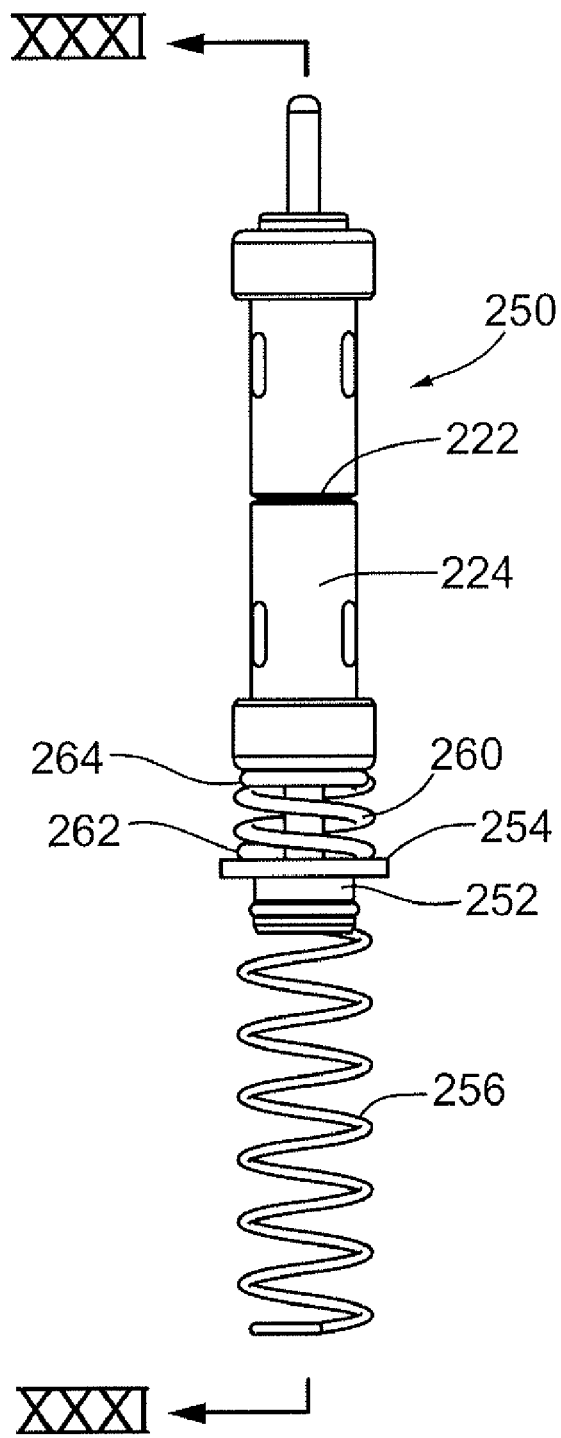
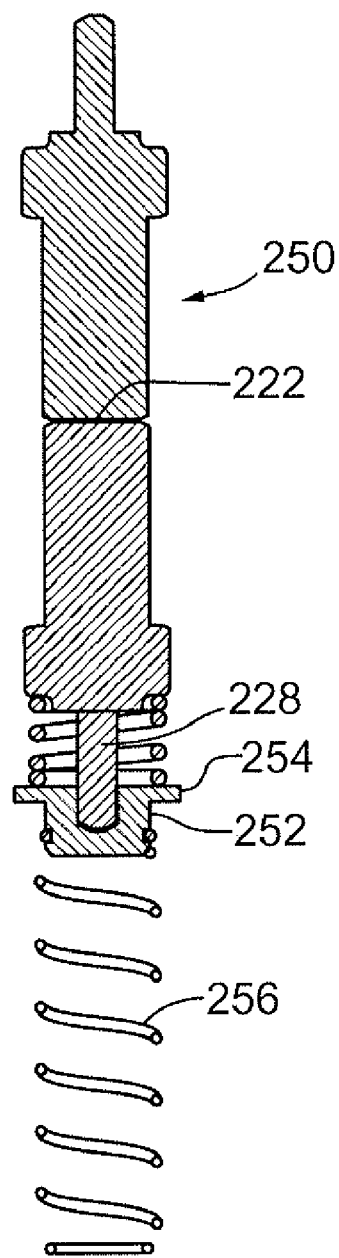
FIG. 30
FIG. 31

US 8,066,197 B2

FAILSAFE THERMAL BYPASS VALVE FOR COOLING SYSTEM

BACKGROUND OF THE INVENTION

This invention relates to thermal bypass valves for a heat exchanger circuit and a heat exchanger system using this type of valve.

Thermal bypass valves are well known in the art of heat exchangers. In particular such valves are commonly used with an oil cooler in order to help regulate the temperature of oil used in engines, transmissions, power steering systems and hydraulic systems. These known valves can provide a flow path by which the oil or heat exchange fluid passing to the valve from an oil source is returned without passing through a heat exchanger or oil cooler during a warm-up period.

An example of an oil cooler bypass valve is that taught in U.S. Pat. No. 6,935,569 which issued Aug. 30, 2005. This known cooler bypass valve has a responsive element that expands to urge a valve member against a valve seat and thereby causes transmission fluid to flow through an oil fluid cooler. A cast valve housing is utilized which is interposed between the cooler and the oil source. The valve actuating mechanism is designed to allow fluid to pass through the valve once the fluid has reached an elevated pressure level.

A possible deficiency with known oil cooler bypass valves is that, if they fail to operate as designed, this can result in substantial damage occurring to the machine or vehicle which requires the oil or heat exchange fluid to be within a desired temperature range in order to operate or in order to operate without undue wear. There is therefore a need to provide a thermal bypass valve which has a so called failsafe construction whereby, for example, in the event of the failure of a thermal actuator in the valve, the valve member will still be moved to a desired position (whether it be an open or closed position) that will prevent significant damage being caused to the machine or component that requires the oil or heat exchange fluid to be within a pre-determined temperature range.

SUMMARY OF THE PRESENT DISCLOSURE

According to one embodiment of a thermal bypass valve for a heat exchanger circuit, the bypass valve comprises a valve housing forming a valve chamber including a bypass passage and having a first port for flow of a heat exchange fluid into the valve chamber, a second port for flow of the heat exchange fluid out of the valve chamber, a third port for flow of heat exchange fluid from the valve chamber to a heat exchanger, a fourth port for flow of the heat exchange fluid from the heat exchanger to the valve chamber, and a bypass port defined by a valve seat provided in the housing. Axially aligned first and second thermally sensitive actuators are mounted in the chamber, are connected to one another, and have respective first and second actuator bodies and respective first and second movable pistons each extendible from one end of its respective actuator body. At least one of the actuator bodies is normally movable in the valve chamber in response to extension of its piston. One of the actuators is adapted to extend its position at a selected higher temperature than a pre-determined temperature required for the other actuator to extend its respective piston. There is also a valve member mounted on one of the first and second actuators which is adjacent the valve seat and movable by either the first or the second actuator from a first position, where the bypass port is in an open state, to a closed position where the bypass port is closed by the valve member engaging the valve seat. A return spring mechanism is mounted in the housing and is adapted to bias an adjacent one of the actuators away from the valve seat. The bias of the return spring mechanism can be overcome during use of the bypass valve by extension of either the first piston or the second piston depending on the temperature to which the actuator bodies are heated.

In an exemplary version of this bypass valve, the valve member is an annular valve disc movably mounted on the first actuator body and the first piston is connected to an end of the second actuator body remote from the second piston.

According to another embodiment of the present disclosure, a heat exchanger system for heating or cooler the heat exchange fluid includes a heat exchanger component adapted to heat or cool the heat exchange fluid. This component includes an inlet for flow of the heat exchange fluid into the component and an outlet for flow of the heat exchange fluid from the component. A thermal bypass valve component includes a valve chamber divided into primary and secondary chamber sections by a bypass valve port formed by a valve seat. The primary chamber section is operably connected to the outlet and the secondary chamber is operably connected to the inlet. The primary chamber section has its own outlet for flow of the heat exchange fluid and the secondary chamber section has an inlet for flow of the heat exchange fluid into this chamber section. The bypass valve component also includes axially aligned first and second thermally sensitive actuators mounted in the primary chamber so as to define a first axis, connected to each other, and having respective first and second actuator bodies and first and second pistons each extendible from one end of its respective actuator body. At least one of the actuator bodies is movable in the valve chamber along the first axis in response to extension of its respective piston. One of the actuators is adapted to extend its piston at a selected temperature different than a pre-determined temperature required for the other actuator to extend its respective piston. There is also a valve member mounted in the valve chamber and capable of moving from an open position where the bypass valve port is open to a closed position where the valve member engages the valve seat and the bypass valve port is closed. The valve member is movable between its open and closed positions by extension of either of the first and second pistons from their respective actuator body. A return spring mechanism is mounted in the housing and is adapted to bias an adjacent one of the actuators to a position where its respective piston is retracted. The bias of the return spring mechanism is normally overcome during use of the heat exchanger system by extension of the respective piston due to the temperature of the one actuator.

In an exemplary version of this heat exchanger system, the bypass valve component includes a valve housing forming the valve chamber and a locking mechanism is mounted in the valve chamber, connected to the valve housing, and adapted to engage and hold one of the actuator bodies upon extension of its respective piston, whereby the valve member is maintained in its existing open or closed position.

According to a further embodiment of the invention, a thermal bypass valve for a heat exchanger circuit comprises a bypass valve enclosure forming a valve chamber, a valve seat defining a bypass valve port and passage means for flow of a heat exchange fluid through the bypass valve port into the valve chamber. The valve enclosure has a first port for flow of the heat exchange fluid into the passage means, a second port for flow of the heat exchange fluid out of valve chamber, a third port for flow of heat exchange fluid from the passage means to a heat exchanger, and a fourth port for flow of the heat exchange fluid from the heat exchanger into the valve chamber. There are also first and second thermally sensitive actuators mounted in the valve chamber and each has an actuator body and piston extendible from one end of the actuator body. The actuators are connected to each other and are aligned with each other in an end-to-end manner. One of the actuators is adapted to extend its piston at a selected temperature different than a pre-determined temperature required for the other actuator to extend its respective piston. A valve mechanism is mounted in the valve chamber and is capable of moving from an open position where the bypass valve port is open to a closed position where the valve mechanism engages the valve seat and the bypass valve port is closed. The valve mechanism is movable between its open and closed positions by extension of either of the pistons from its respective actuator body. A return spring mechanism is mounted in the housing and is adapted to bias one of the actuators to a position where its respective piston is retracted. The bias of the return spring is normally overcome during use of the heat exchanger system by extension of this respective piston due to the temperature of the one actuator.

These and other aspects of the disclosed bypass valves and heat exchanger systems will become more readily apparent to those having ordinary skill in the art from the following detailed description taken in conjunction with the accompanying drawings.

BRIEF DESCRIPTION OF THE DRAWINGS

So that those having ordinary skill in the art to which the present disclosure pertains will more readily understand how to make and use the subject invention, exemplary embodiments thereof will be described in detail herein below with reference to the drawings, wherein:

FIG. 10 is a top view of the assembly of FIG. 8;

FIG. 11 is a cross-sectional view of the assembly of FIG. 8 taken along the line XI-XI of FIG. 10;

FIG. 12 is a top view of the valve seat member only used in the assembly of FIG. 8;

FIG. 18 is a side view of a valve assembly including a valve cap and two aligned actuators, this view showing the normal, unlocked position;

FIG. 19 is a cross-sectional view taken along the line XIX-XIX of FIG. 18;

FIG. 30 is a side view of another version of a valve assembly with the closed ends of the two actuators attached;

FIG. 31 is a cross-sectional view taken along the line XXXI-XXXI of FIG. 30.

DESCRIPTION OF EXEMPLARY EMBODIMENTS

Figure 1:
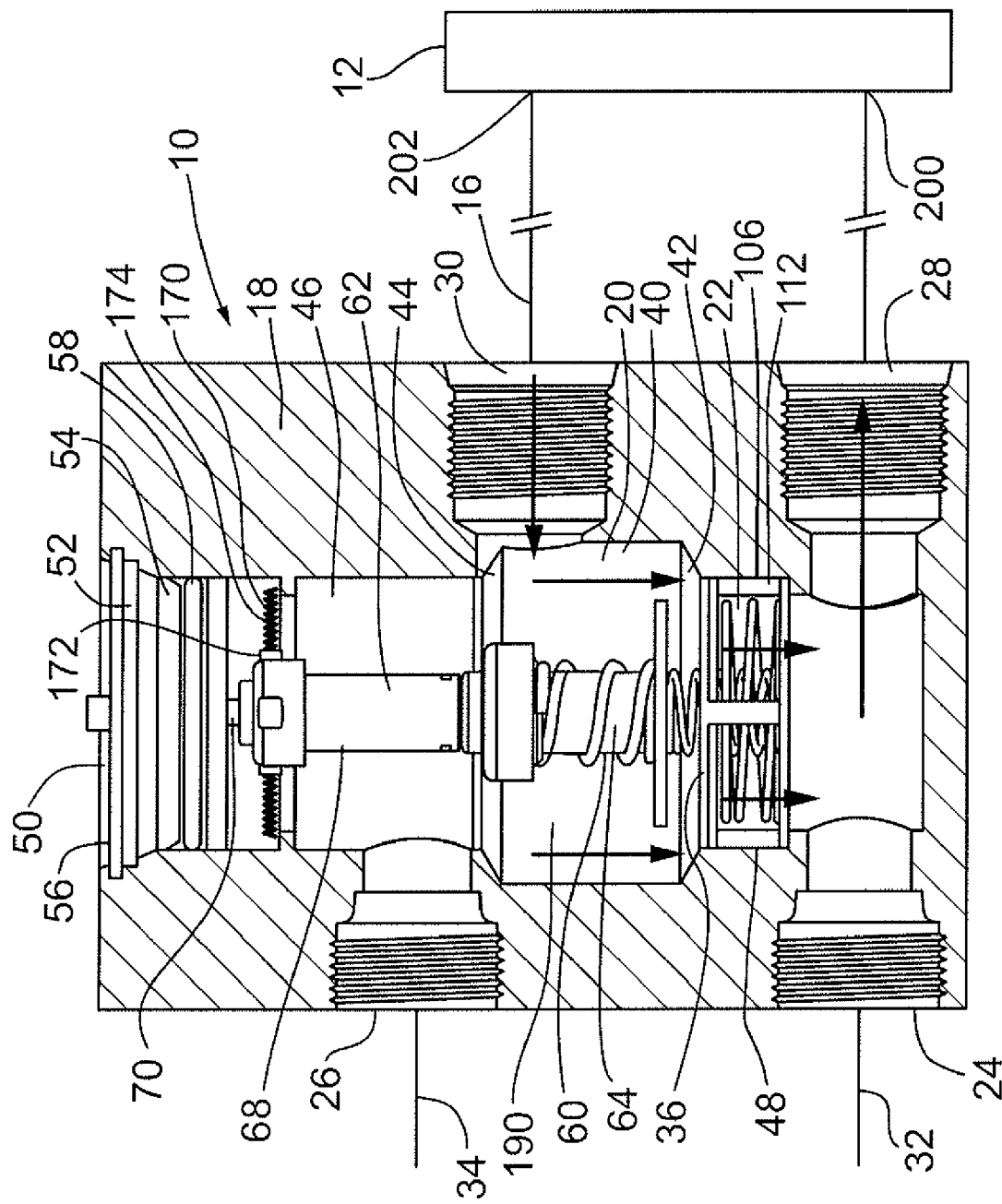
FIG. 1 is a cross-sectional elevation of a thermal bypass valve showing this valve in a cold position in which fluid bypass of a heat exchanger can occur.
Figure 2:
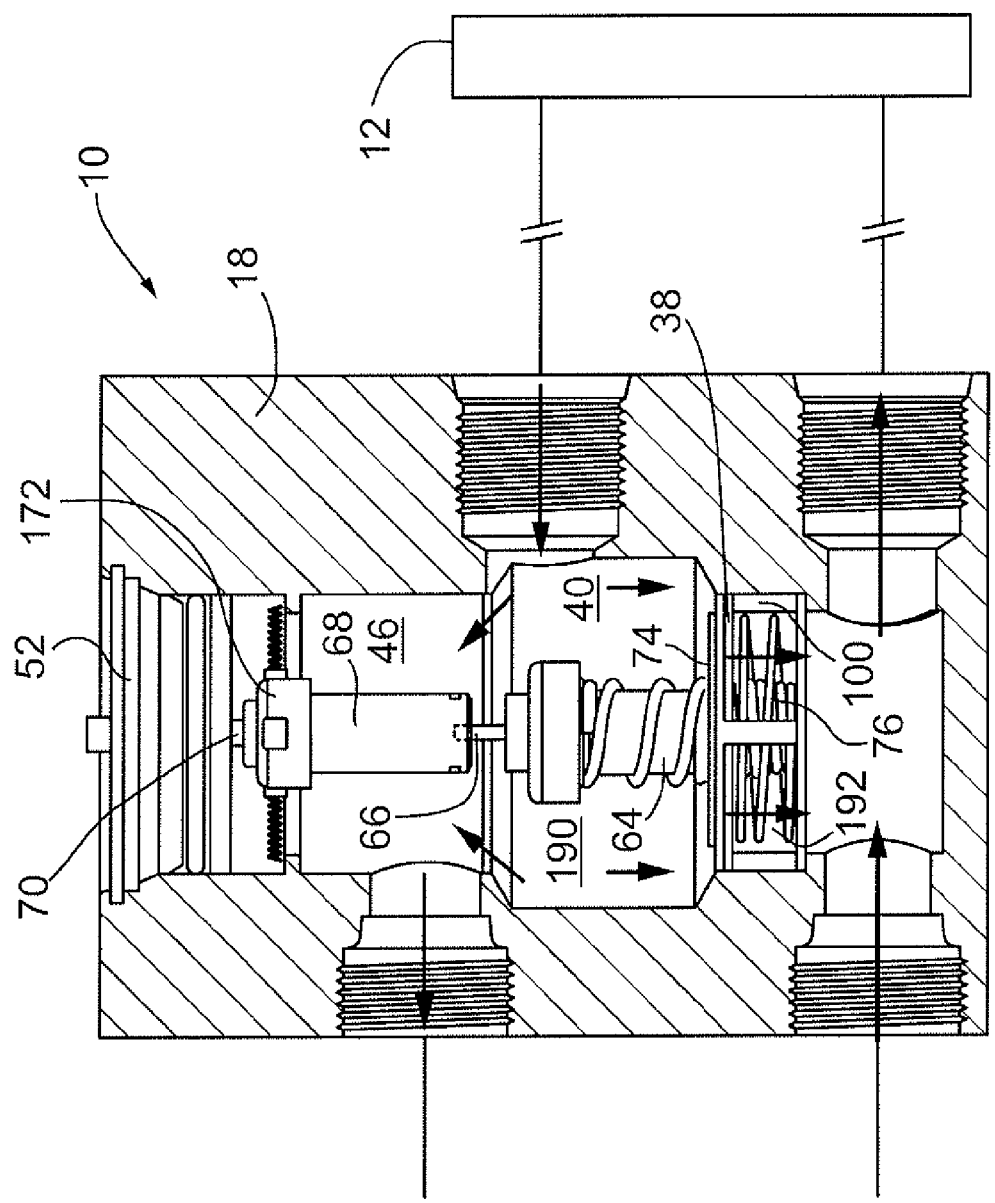
FIG. 2 is a cross-sectional elevation similar to FIG. 1 showing the bypass valve in a hot position in which fluid bypass of the heat exchanger is cut off.
Figure 3:
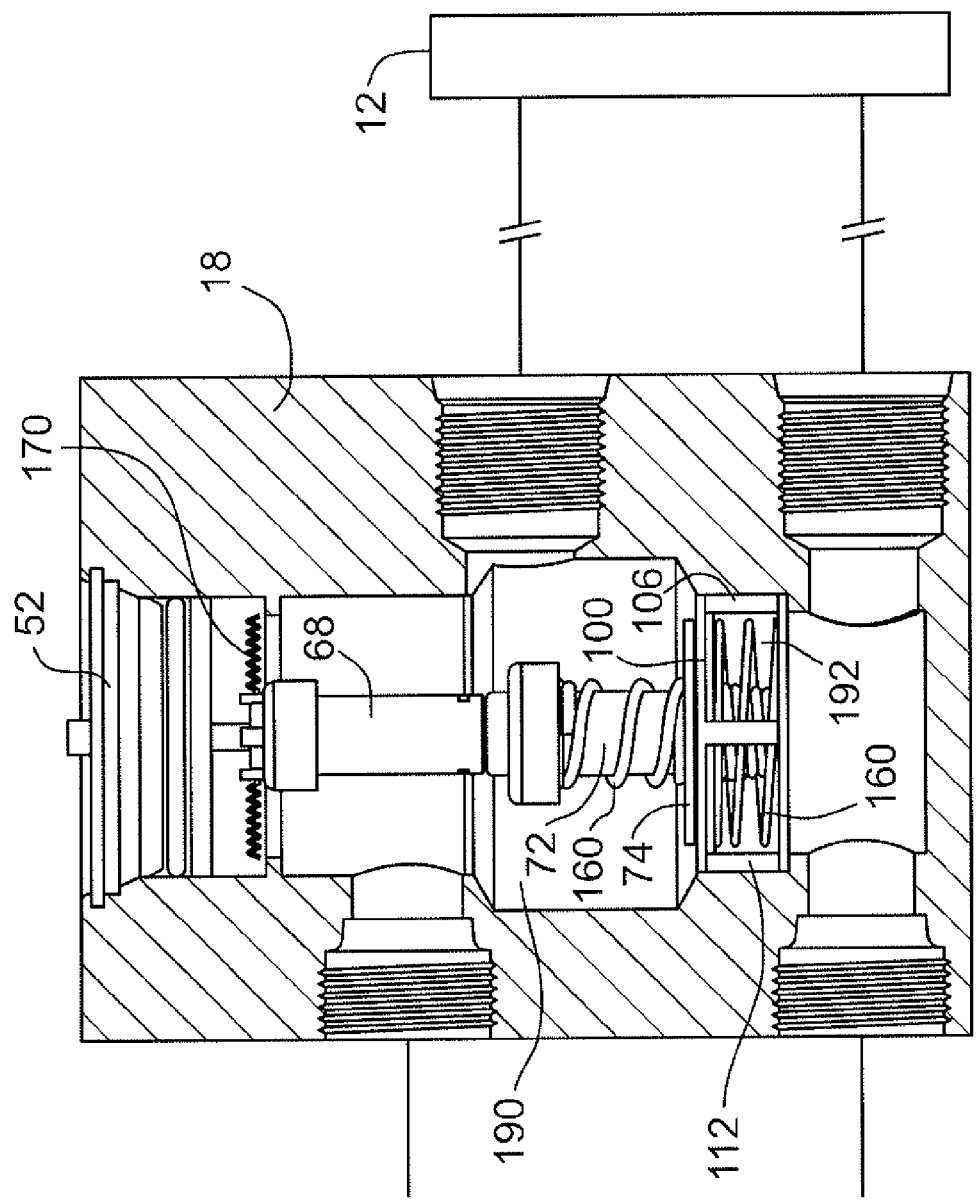
FIG. 3 is a cross-sectional elevation similar to FIG. 2 showing the bypass valve with its upper thermally sensitive actuator in a locked, downward position so that fluid bypass of the heat exchanger is prevented.

With reference to FIGS. 1 to 3, there is shown an example of a thermal bypass valve indicated generally be reference 10 which can be used in a heat exchanger circuit to control the flow of a fluid, such as transmission fluid to a heat exchanger 12 to which first and second conduits 14 and 16 are connected. The heat exchanger can be a cooler or cooler unit of standard construction if it is being used to cool transmission fluid or transmission oil. The bypass valve has a valve housing indicated generally by reference 18 which forms a valve chamber 20 that includes a bypass passage 22. The illustrated bypass valve housing has a first port 24 for flow of the heat exchange fluid i.e. transmission fluid into the valve chamber, a second port 26 for the flow of the heat exchange fluid out of the valve chamber, a third port 28 for the flow of the heat exchange fluid from the valve chamber to the heat exchanger 12, and a fourth port 30 for the flow of heat exchange fluid from the heat exchanger to the valve chamber. Although these four ports are shown in a manner where their central axes are parallel and lie in the same plane, it will be appreciated by those skilled in the art that this arrangement of the ports is not necessary and the ports can have central axes which extend at acute angles to the top and bottom surfaces of the housing, for example, and their central axes can extend radially in a variety of different directions from a central longitudinal axis of the valve chamber, the particular direction selected depending to some extent on the intended use of the bypass valve and the location of the components to which it must be connected. These four ports can also be considered aperture means which are connected to the valve chamber. Conduits 32 and 34 can be connected to the ports 24, 26 respectively of the valve and these conduits can be connected to a vehicle component such as a transmission (not shown). This type of bypass valve is generally referred to as a four port bypass valve because of the four conduits 14, 16, 32 and 34 connected to the valve.

The housing also has a bypass port 36 around which extends a valve seat 38, an exemplary version of which is illustrated in FIGS. 8 and 10 to 12. The illustrated valve chamber includes the wide section 40 located centrally in the housing, this section being substantially cylindrical except for inwardly tapering end sections 42 and 44. Axially aligned with and above the section 40 is a narrower section 46 which can also be substantially cylindrical. Extending downwardly from the wide section 40 is a narrower lower section of the chamber which forms the aforementioned bypass passageway 22. This narrower section 48 is defined by a cylindrical wall and is sized to accommodate the aforementioned valve seat 38. The housing itself can be formed of steel or another metal or alternatively a moldable material such as a plastics material which may be thermoplastic or a thermosetting material and which may contain reinforcements such as glass fibre or particulate reinforcement in a manner known perse. The aforementioned ports 24, 26, 28 and 30 can be internally threaded as shown for receiving threaded end portions of the conduits. However, the conduits and ports could alternatively be connected using other methods including, for example, molding the ports around the conduits.

The housing 18 is formed with an opening 50 at one end shown as the top end in FIGS. 1 to 3. Through this opening the working components of the bypass valve can be inserted in the valve chamber during assembly of the valve. A closure cap 52 (or cartridge) is inserted into the opening to seal the chamber and can be considered part of the housing. The cap can be formed from a moldable plastic material that may also contain reinforcements such as glass fibre. The enclosure cap can in some versions be formed from steel or other metals. The illustrated cap has a substantially cylindrical wall 54 sized to fit in the cylindrical passage forming the narrower section 46 of the valve chamber and further has a larger diameter head which helps locate the cap in the passage. An annular groove can be formed in the cylindrical wall 54 to accommodate an 0 ring seal 58. The cap is held in place by a retaining clip 56.

As clearly shown in FIGS. 1 to 3, axially aligned first and second thermally sensitive actuators 60, 62 are mounted along the central longitudinal axis of the valve chamber. The first actuator 60 has a first actuator body 64 and a first movable piston extendible from one end of the body (which is the top end in the views of FIGS. 1 to 3). The second actuator has a second actuator body 68 and a second movable piston 70 which extends from one end of the body 68, this being the top end in the illustrated bypass valve of FIGS. 1 to 3. It will be appreciated by those skilled in the art that instead of extending from the ends illustrated in FIGS. 1 to 3, it is also possible for the two pistons to extend in the opposite direction in some embodiments of the bypass valve. One of the first and second pistons of these actuators operably engages the actuator body associated with the other piston at an end to the actuator body remote from the other piston. In the illustrated embodiment it is the first piston 66 which engages the bottom end of the second actuator body 68. This piston is fixably attached to the end of the actuator body. This type of fixed connection can be accomplished by a press fit of an end section of the piston in a cooperating recess formed in the end of the adjacent actuator body or by gluing. It is also possible to provide a slip fit between the piston and the cooperating recess formed in the adjacent end of the actuator body. Another form of attachment for the end of the piston 66 is to provide threads on its outer end section which engage threads in a central end cavity formed in the body 68.

It will be understood by those skilled in this art that the actuators can take the form of suitable so-called wax motors, the construction of which is well known in the thermal bypass valve art. Each of the actuator bodies 64, 68 is normally movable in the valve chamber in response to extension of its respective piston. One of the actuators is adapted to extend its piston at a selected higher temperature than a pre-determined temperature required for the other actuator to extend its respective piston. In other words, one of the actuators 60, 62 is adapted to extend its piston at a selected temperature which is different than a pre-determined temperature required for the other actuator to extend its respective piston. Except for this temperature difference, the two actuators, 60, 62 can be constructed in a similar manner.

Figure 4:
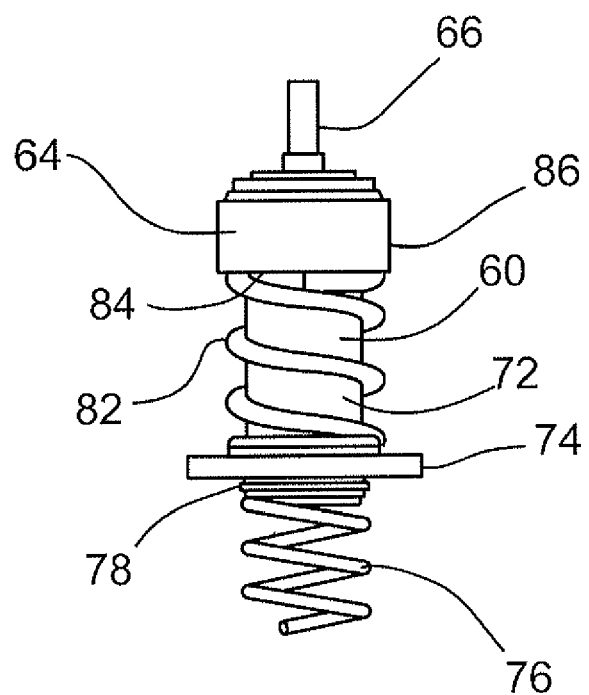
FIG. 4 is an elevational view of part of the valve assembly used in the bypass valve of FIG. 1, this view showing only one of the two thermally sensitive actuators.
Figure 5:
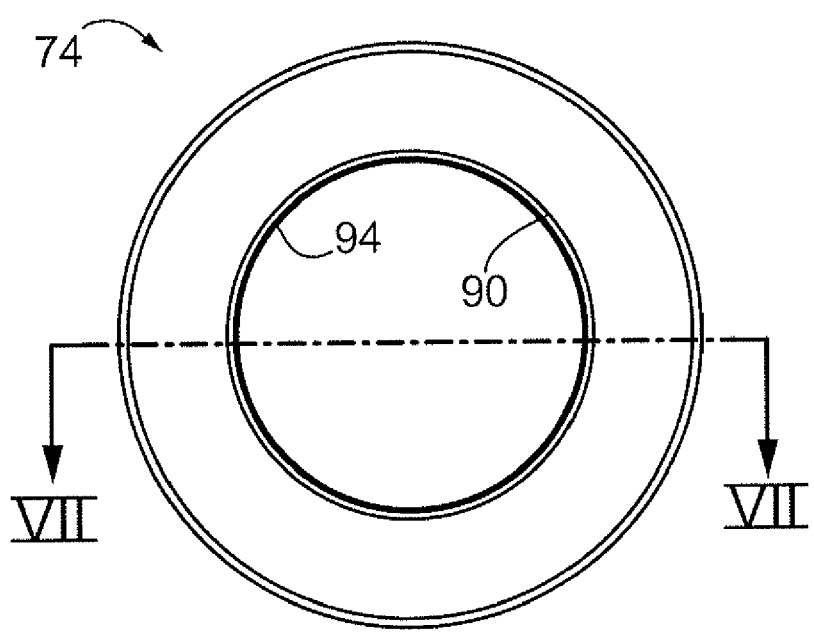
FIG. 5 is a plan view of an annular ring that forms a valve member in the bypass valve.
Figure 6:
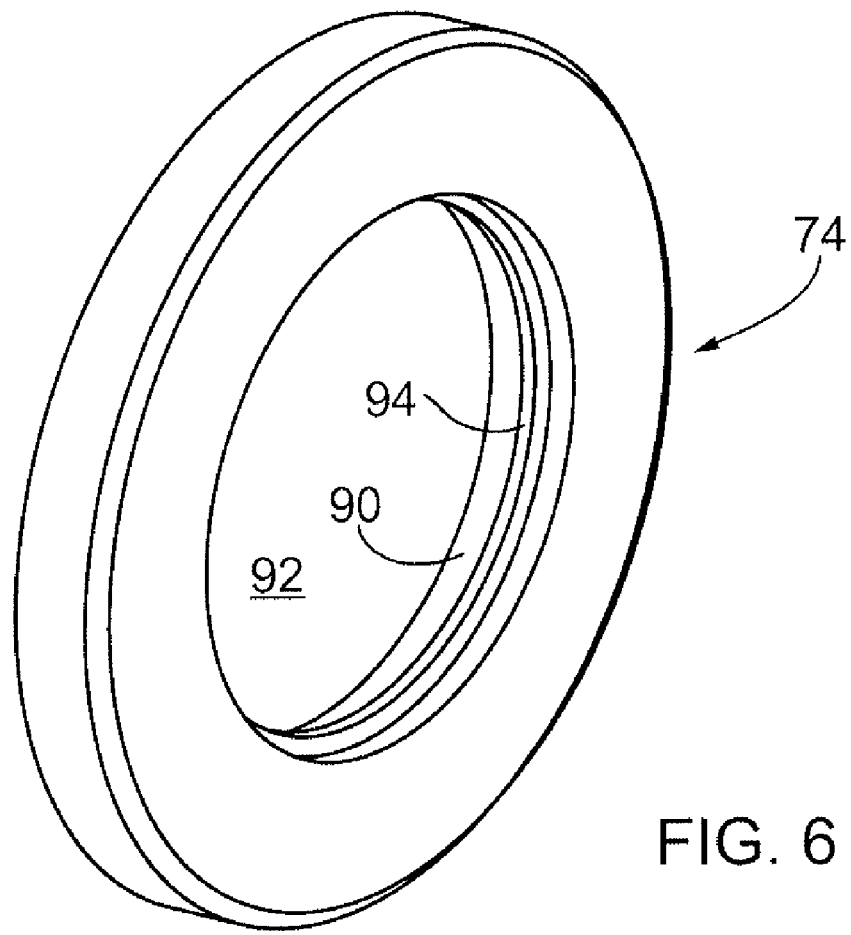
FIG. 6 is a perspective view of the annular ring of FIG. 5.
Figure 7:
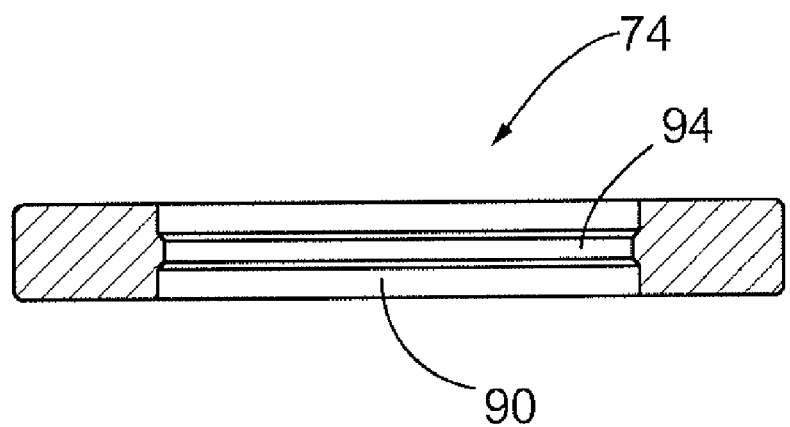
FIG. 7 is a sectional view of the annular ring taken along the line VII-VII of FIG. 5.
Figure 8:
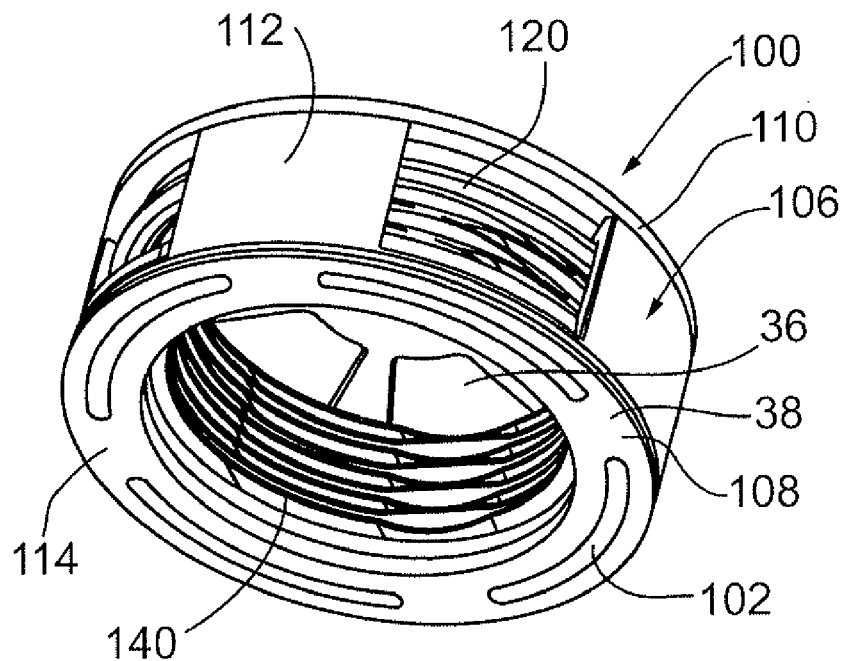
FIG. 8 is an isometric view showing a top end and one side of a bypass valve seat and pressure relief assembly used in the valve of FIG. 1.
Figure 9:
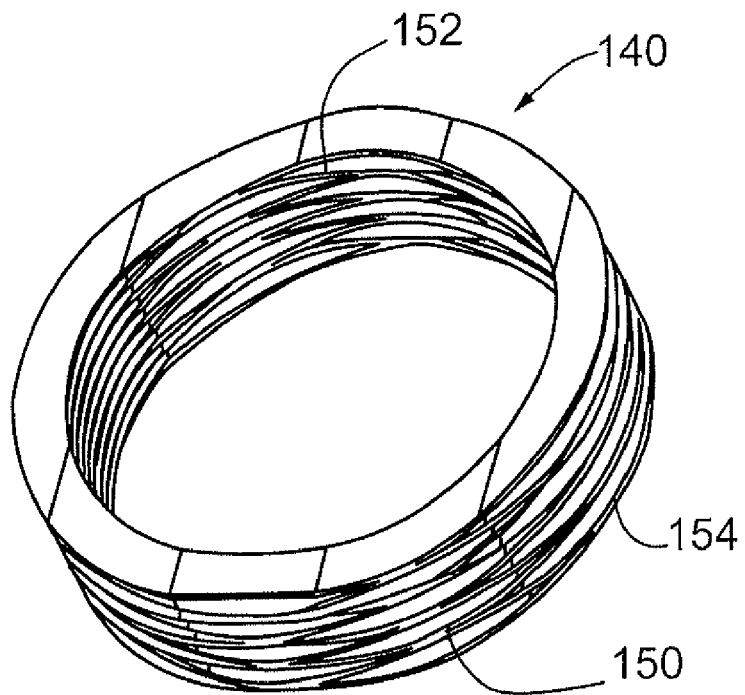
FIG. 9 is a isometric view of a spring used in the assembly of FIG. 8.
Figure 13:
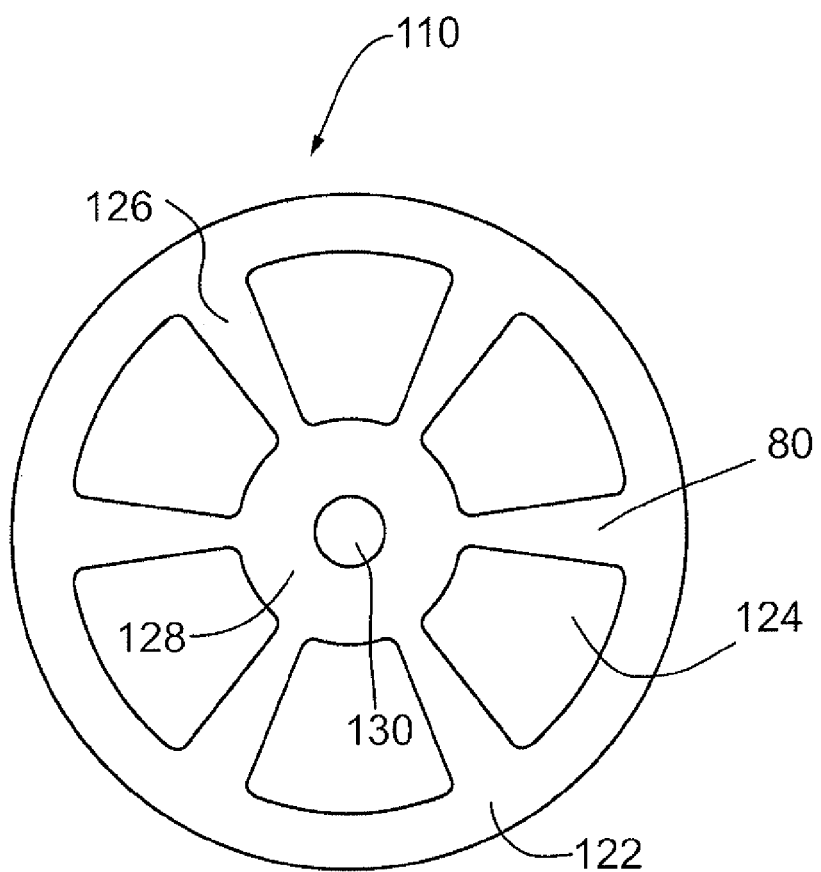
FIG. 13 is a bottom view of a spring seat member used in the assembly of FIG. 8.
Figure 14:
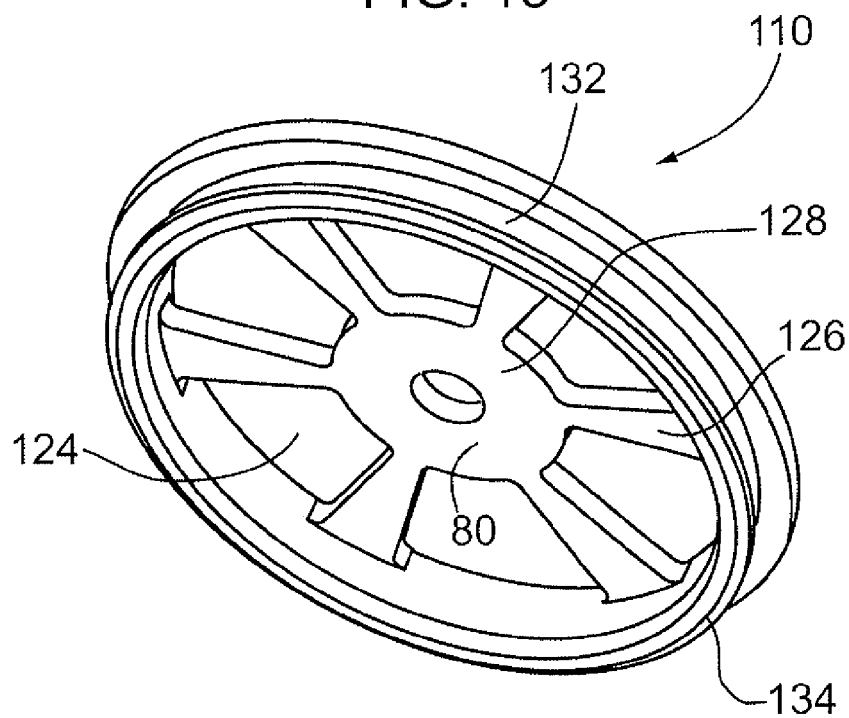
FIG. 14 is an isometric view showing a top side of a spring seat member forming the bottom side of the assembly of FIG. 8.
Figure 15:
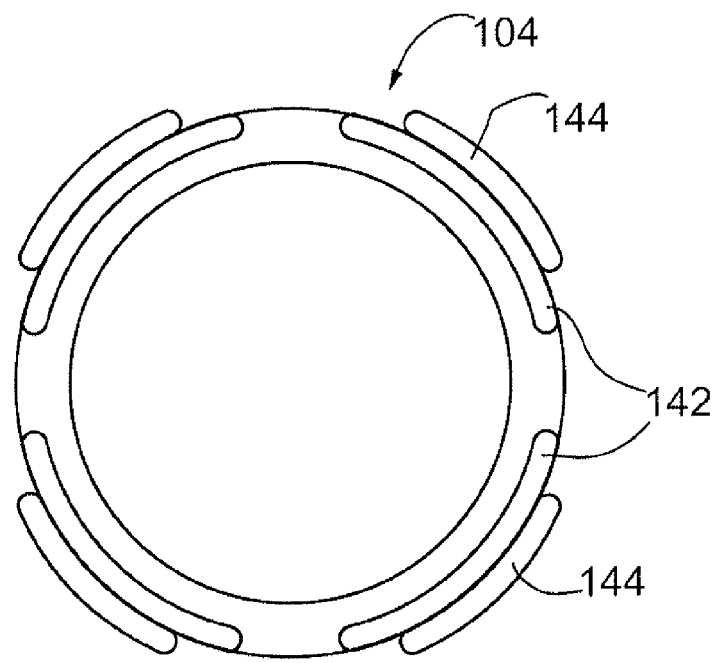
FIG. 15 is a top view of a ring member used in the assembly of FIG. 8.
Figure 16:
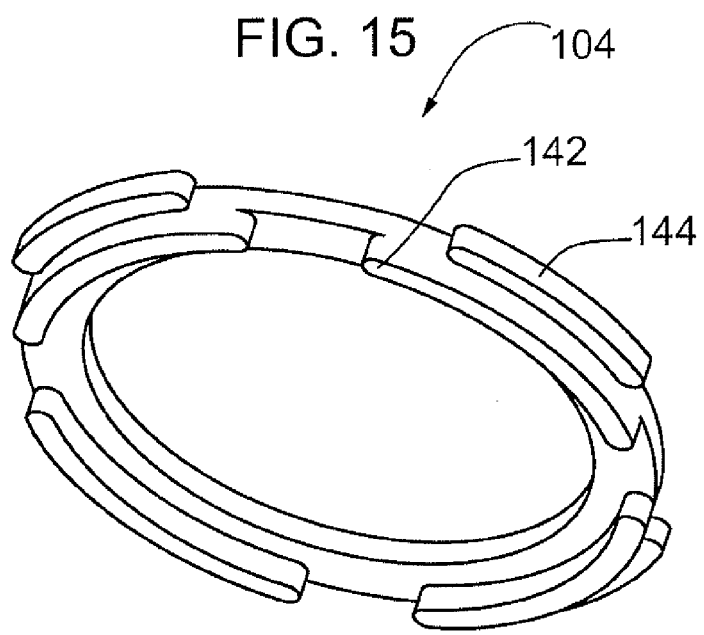
FIG. 16 is an isometric view of the ring member of FIG. 15.
Figure 17:
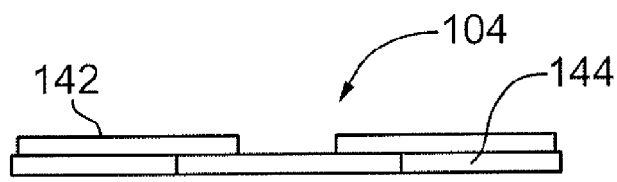
FIG. 17 is an edge view of the ring member.
Figure 20:
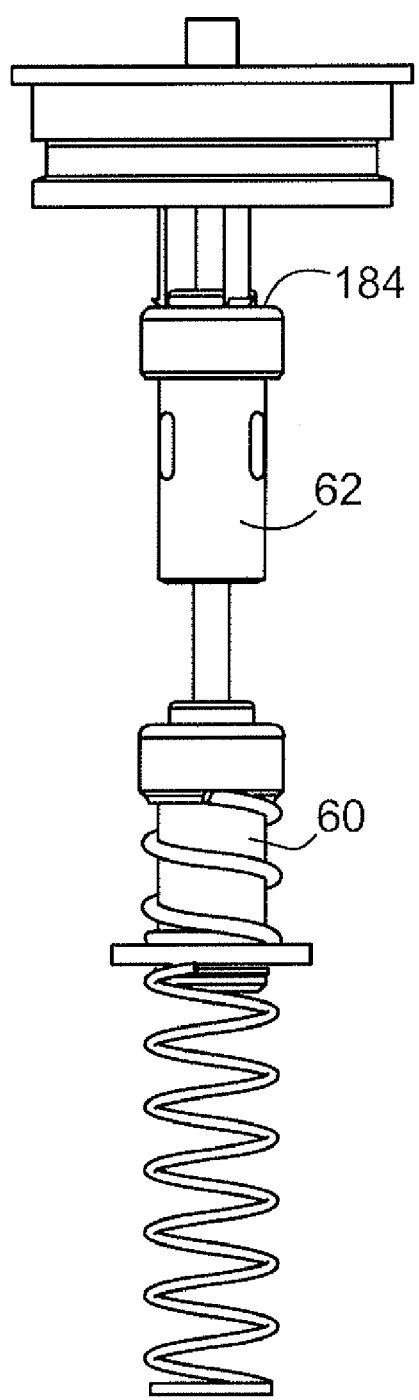
FIG. 20 is a side view of the valve assembly of FIG. 18, this view showing a locked position.
Figure 21:
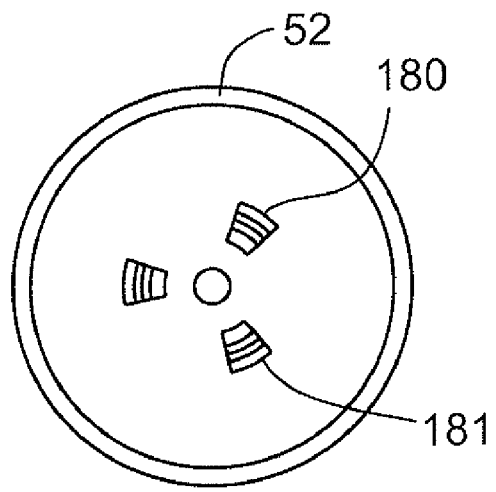
FIG. 21 is a bottom view of the valve cap of FIG. 18 showing three locking members in their radially extended position.
Figure 22:
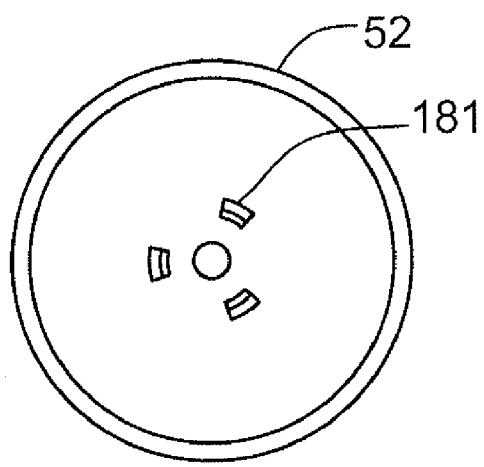
FIG. 22 is a bottom view similar to FIG. 21 showing the three locking members in their inner locking position.
Figures 23, 24:
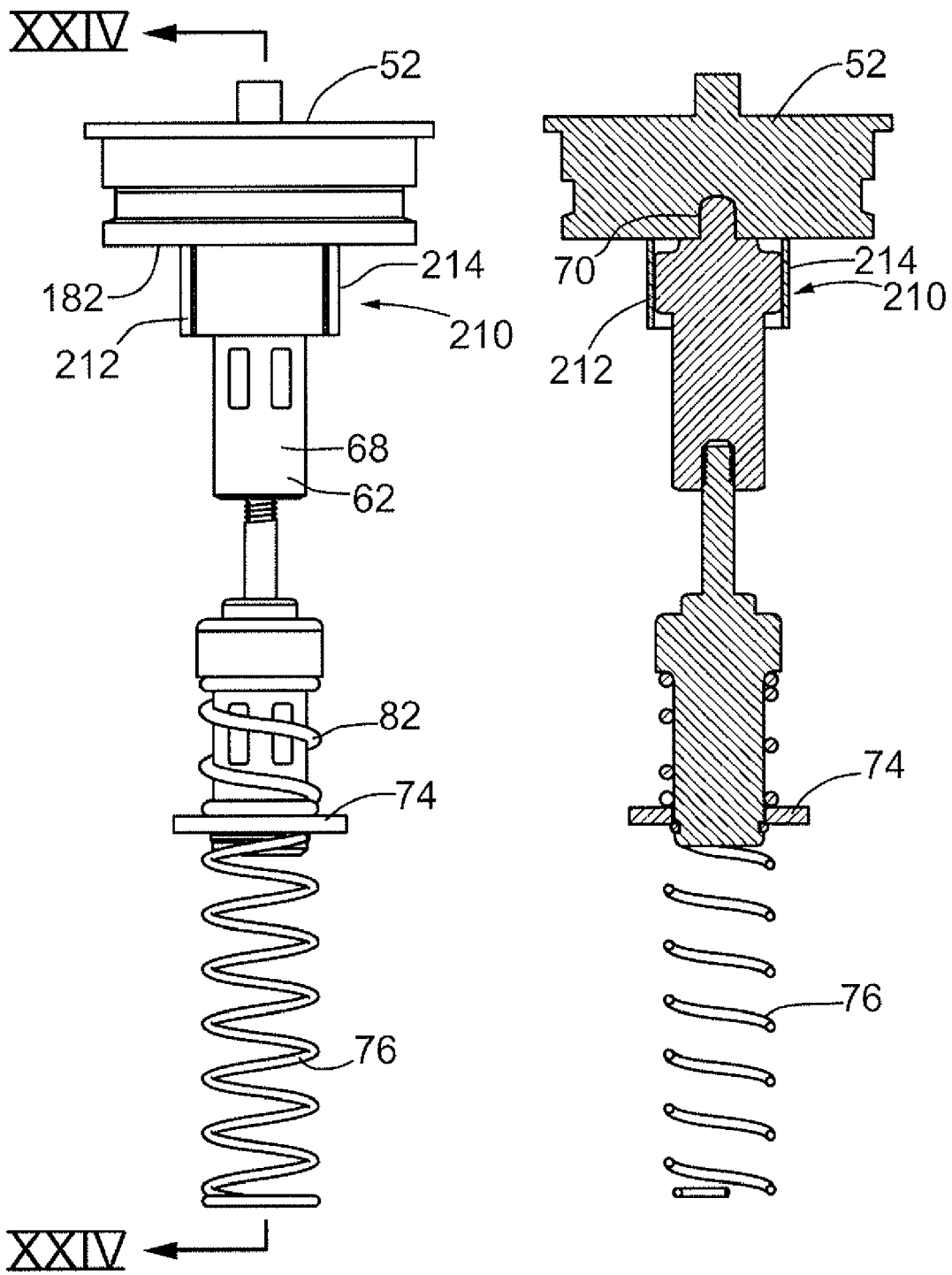
FIG. 23 is a side view of another valve assembly including a valve cap and two aligned actuators, this view showing the normal, unlocked position.
FIG. 24 is a cross-sectional view taken along the line XXIV-XXIV of FIG. 23.

The construction of the first actuator 60 and certain valve components associated therewith will now be described in reference to FIG. 4. The actuator body has a narrower section 72 which can be described as the shaft section. The shaft section has a closed bottom end with a diameter less than the bypass port 26. A bypass valve member is mounted on the shaft section of the first actuator 60 which is the actuator adjacent the valve seat 38. The valve member 74 is normally movable by one of the two actuators from a first position shown in FIG. 1, where the bypass port is in an open state, to a closed position shown in FIG. 2 where the bypass port is closed by the valve member engaging the valve seat 38. In the illustrated bypass valve, the valve member is normally moved by the first actuator 60. An exemplary form of the valve member is an annular valve disk which is movably mounted on the actuator body 64 and this form of valve member is shown separately in FIGS. 5 to 7 and is described in more detail below. The bypass valve assembly includes a return spring mechanism 76 which can take the form of a coil spring mounted in the housing and engaging one of the actuators so as to bias this one actuator away from the valve seat 38. In the illustrated embodiment the return spring engages the closed end of the first actuator body 64 and end 78 of the spring can be attached to the actuator body by being located in a groove (not shown) formed in a closed end portion of the shaft section 72. The return spring has an opposite end which engages a spring seat described below (see FIGS. 13 and 14). The spring also acts as a stop for preventing the valve member 74 from sliding off the shaft of the actuator when the valve member is lifted off the valve seat. An override spring 82 surrounds the shaft section of the first actuator body. One end of this spring engages an annular shoulder 84 which is formed at the bottom end of an enlarged cylindrical head portion 86 of the actuator body. At the opposite end of the spring 82, the spring engages one side of the valve member 74. Because upward movement of the first piston is limited by its engagement with the closed end of actuator body 68, when the first actuator reaches a pre-determined temperature so that its piston extends, the shaft section 72 is forced downwardly through the bypass port compressing the return spring. Downward movement of the shoulder 84 causes the spring 82 to be pressed downwardly such that the valve member 74 is pressed down to engage the valve seat. When the temperature in the chamber drops down below the predetermined temperature, the first piston retracts and the return spring urges the actuator body upwardly which causes the valve member 74 to be lifted off the valve seat again. This effectively opens the bypass port 36 allowing bypass flow through this port.

The annular valve member 74 can be made from a synthetic material such as a plastic. For example, for various applications suitable materials can be polyamide 4/6 or polyamide 66. Suitable nylons can also be used. The valve member has a cylindrical inner surface 90 defining a central opening 92 through which the shaft section 72 extends. A circumferentially and inwardly extending wiper or rib 94 extends midway around the surface 90 for sliding engagement of the shaft. In one embodiment, the rib 94 has a thickness between one-third to one-seventh of the thickness of the ring. One example of the ring has a thickness of three mm and a central opening 92 having an inner diameter of 8.43 to 8.48 mm. The dimensions of the wiper are selected to facilitate use of the member over the LMC-MMC range of the shaft (where LMC refers to "least material condition" and MMC refers to "maximum material condition"), while providing a leak resistant non-binding seal between the valve member and the shaft. It will be appreciated that it is possible to construct the valve seat 38 in a thermal bypass valve of the present disclosure wherein the valve seat is simply formed by an internal shoulder extending about the valve chamber 20 and the valve member is able to engage this valve seat and close the bypass port by extension of either the first or second piston.

However in an exemplary version of the present thermal bypass valve and as illustrated in the figures, there is provided a valve mechanism for forward flow pressure relief, this mechanism being mounted in the valve chamber 20. This relief valve mechanism includes at least one relief port adjacent the bypass port 36. The relief valve mechanism or relief valve means is indicated generally in the drawings by reference 100. The components or parts that make up the relief valve mechanism are illustrated in FIGS. 8 to 17. The illustrated relief valve mechanism includes several relief ports 102. In particular there are shown four such ports which form an arc of less than 90 degrees. The mechanism also includes at least one relief valve member 104 shown separately in FIGS. 15 to 17. Although only one relief valve member is shown, it will be appreciated by those skilled in the art that the relief valve mechanism can be constructed with two, three, or more separate relief valve members. The relief valve member or members is or are biased to a closed position where the relief ports are closed by the relief valve member or members.

To explain further, in the illustrated embodiment the valve seat 38 and the relief ports 102 are provided by a separate assembly which can be referred to as a spring enclosure indicated at 106. The spring enclosure includes a first enclosure section 108 and a second enclosure section 110 shown separately in FIGS. 13 and 14. These two sections are detachably connected to each other. In an exemplary embodiment the first section has four legs 112 that extend downwardly (as shown in FIGS. 1 to 3) from the valve seat formed from a substantially annular top section 114. This section 108 including the four legs is made of a resilient material so that that legs can bend outwardly to attach to the section 110. Each leg is formed with an inner flange 116 at its free end as shown in FIG. 11. This flange an inwardly and downwardly facing surface at 118 which facilitates attachment of the second section 110. The legs are spaced apart by gaps 120.

The second enclosure section 110 has a flat bottom surface 122 in which can be formed a plurality of openings 124 through which the heat exchange fluid can flow in the bypass stage. These openings are separated by flat spokes 126 of which there are six in the illustrated version. The spokes extend to a circular, central hub 128 which can be formed with a center hole 130, if desired. Extending upwardly from the top surface of the section 110 is an annular rim 132 formed with an outwardly projecting flange at 134. Because of the outer sloping surface of this flange, the rim 134 can be pushed into locking engagement with the legs or connectors 112 as shown in FIG. 11. In this way the first and second enclosure sections 108, 110 are connected together and form a cage member.

The spring enclosure 106 holds two components for pressure relief purposes. Firstly it holds the relief valve member 104 which is adapted for mounting in the enclosure and which under normal operating conditions acts to close the pressure relief ports 102. The relief valve member 104 is movable in the enclosure and is guided thereby. The spring enclosure also holds a coil type spring 140 shown separately in FIG. 9. This spring biases the valve member 104 to a closed position in which the valve member closes the pressure relief ports 102. The closed position is shown in FIG. 11. The exemplary valve member 104 is formed with a plurality of port blocking ridges 142, the number of which corresponds to the number of relief ports 102. In the closed position of the relief valve, each of the ridges is received in a respective one of the relief ports 102 in order to close same in a sealing manner. In order to keep the ridges properly aligned the valve member 104 can be formed with radially projecting integral guides 144. These arc-shaped guides have a length corresponding to the width of the gaps 120. Thus engagement between the ends of the guides 144 and the edges of the legs keeps the ridges in proper alignment with their perspective relief ports.

The exemplary spring 140 is formed by means of a flat, carbon steel, coiled wire 150. This wire can be formed with an evenly distributed wave as indicated at 152 in a known manner. By providing such a spring, the spring pressure is applied evenly to the bottom side of the valve member 104. A bottom end 154 of the spring rests upon the flat spring seat formed by the section 110 of the enclosure. The return spring 76 extends through the center of the spring 140 and also through the centre of the spring enclosure. Other types of springs can be used instead of the spring shown in FIGS. 8 and 9. For example, a simple coil spring 160 made of round wire is shown in FIGS. 1 to 3.

To explain this optional feature further, the relief valve mechanism including the valve member 104 and the spring 140 is mounted in the valve chamber by means of the spring enclosure 106 and is movable between open and closed positions. The relief valve mechanism and in particular the valve member 104 is biased toward the closed position by the spring 140. In the event of excessive pressure build up in the section of the valve chamber which contains the two actuators during use of the bypass valve, the relief valve mechanism moves to its open position to allow the heat exchange fluid to flow through the pressure relief ports 102 thereby reducing the pressure build up by allowing the heat exchange fluid to flow into the narrow section 48 of the chamber.

In an exemplary version of the present thermal bypass valve there is provided a locking mechanism which is mounted in the valve housing and its adapted to engage and hold the actuator whose piston extends at the selected higher temperature. An embodiment of this locking mechanism is indicated generally by reference 170 in FIGS. 1 and 3. In the illustrated embodiment the second actuator 62 is constructed so that its piston 70 extends at the selected higher temperature. This can occur when the first actuator fails to operate (that is fails to extend its piston) at the predetermined or designed temperature at which this actuator would normally extend its piston. The locking mechanism 170 moves from an unlocked position shown in FIGS. 1 and 2 to a locked position (shown in FIG. 3) where the locking mechanism engages and holds the second actuator body 68. In FIG. 3, the actuator body has been moved down by its respective piston. Once the locking mechanism operates to lock the second actuator body in the down position, it can no longer move upwards, even if the temperature of the heat exchange fluid should change, for example by becoming cooler. In this way the locking mechanism ensures that the valve member 74 remains in engagement with the valve seat.

In the first embodiment of the locking mechanism illustrated in FIGS. 1 to 3, the mechanism has at least one spring operated lock member 172. As illustrated there are at least two of these lock members, one on each side of the expanded head section 86 of the actuator body. Prior to downward movement of the second actuator body because of an elevation in temperature of the heat exchange fluid, the lock members are held in an unlocked position by the head portion of the actuator body. It is only when the actuator body has been forced downwardly by its piston that the lock members are able to move inwardly to the lock position shown in FIG. 3. In this first version of the locking mechanism, a coil spring 174 for each lock member can be housed in a radially extending passageway formed in the valve wall. Alternatively, the expanded head of the second actuator body can extend into a cavity formed in a bottom portion of the cap 52 and the radial passages for the springs 174 can be formed in an annular wall forming the bottom section of the cap.

An alternative form of locking mechanism is illustrated in FIGS. 18 to 22. This locking mechanism 180 is formed by flexible tabs 181 that extend from the inner side 182 of the closure cap 52 that is used to sealingly close one end of the valve chamber. These tabs can, for example, be made of a suitable plastic material that can withstand the temperatures that can be encountered in the bypass valve. Although three, evenly spaced tabs are shown, there could be only one or two tabs or more than three tabs. As in the first embodiment of the locking mechanism, the tabs can be initially held in their unlocked position (shown in FIG. 18) by the expanded head section of the actuator body. The head section is detachably embraced by the tabs which are in a radially extended position. However extension of the piston from the end of the actuator body 68 will cause this actuator body to move away from the inner side 182, thereby enabling the tabs to move to the locked position shown in FIG. 20. In this locked position, the tabs engage the end 184 of the actuator body and prevent the actuator body from moving back to its original position.

Figure 25:
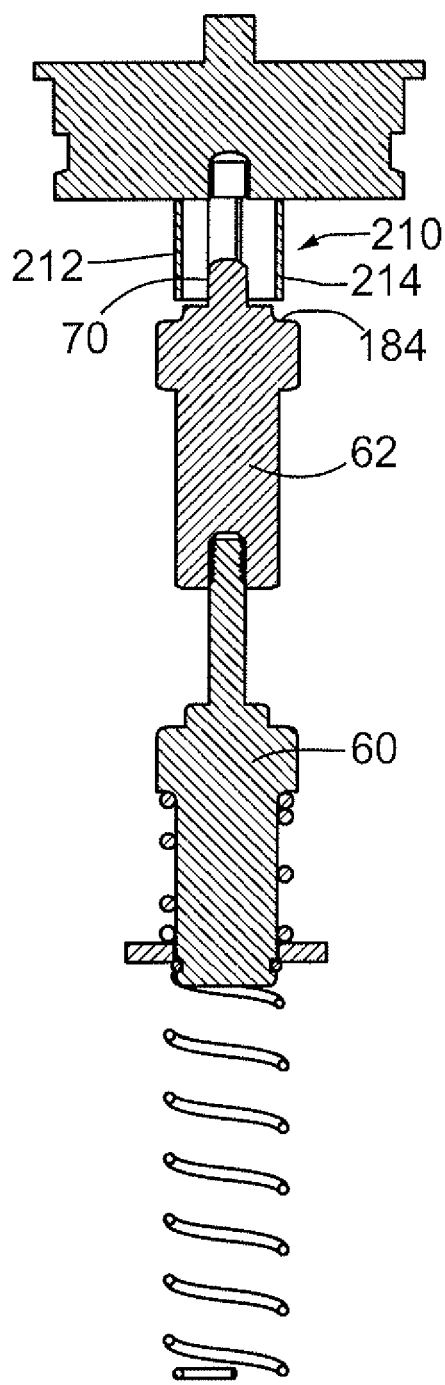
FIG. 25 is a cross-sectional view similar to FIG. 24, this view showing a locked position.
Figure 26:
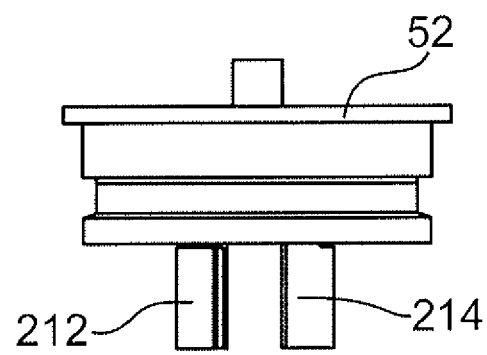
FIG. 26 is a side view of the valve cap of the embodiment of FIG. 18.
Figure 27:
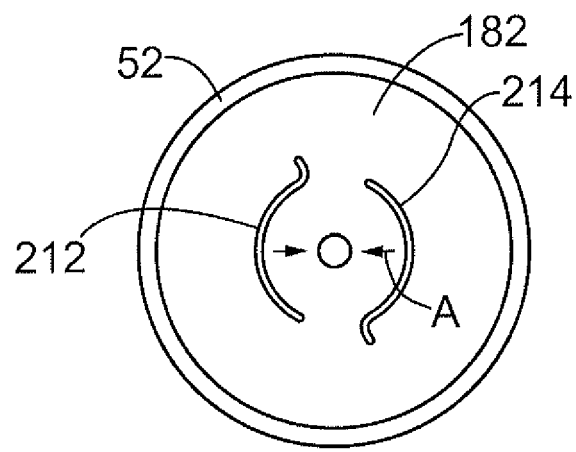
FIG. 27 is a bottom view of the valve cap of FIG. 26 showing two locking clips in a radially extended position.

Still another form of locking mechanism is illustrated in FIGS. 23 to 27. This locking mechanism is indicated generally at 210. The locking mechanism is shown in the normal position in FIGS. 23 and 24 where the locking mechanism embraces the expanded head portion of the actuator body 68. The locking mechanism comprises two locking clips 212, 214 which, in the normal position, are disposed on opposite sides of the expanded head of the actuator. The clips are shown in their radially extended position in FIGS. 23, 24, 26 and 27 and they are shown in their locked position in FIG. 25. Each clip is arc-shaped as seen from the bottom side of the cap and as shown in FIG. 27. The concave inner surface of each clip can match the curvature of the exterior of the expanded head section of the actuator. The clips extend downwardly from and are connected at one end to the inner side 182 of the closure cap. The clips can be made of the same material as the cap 52 provided this material has sufficiently sufficient flexibility and resiliency to allow the clips to move inwardly to the position shown in FIG. 25 when the piston of the actuator body 68 extends to drive the actuator body downwardly (as shown in FIG. 25). Thus the clips can be made of a suitable plastic material which can withstand the interior valve temperatures. Although only two clips are shown, it is possible for there to be three or more clips of this construction distributed evenly about the circumference of the head of the actuator. As in the embodiment of FIGS. 18 to 20, the clips are initially held in their unlocked, radially outer position by the expanded heat section of the actuator body 68. However extension of the piston 70 will cause its actuator body to move away from the inner side 182, thereby enabling the clips to move to the locked position shown in FIG. 25. In this position, the bottom ends of the clips engage the end 184 of the actuator body and prevent the actuator body from moving back to the position shown in FIG. 24. It will be understood that each clip 212, 214 is only connected at one end of the upper edge of the clip to the bottom 182 of the cap. In this way the main portion of each clip can pivot in a radial direction towards or away from the central axis defined by the center of the cap. The arrows A in FIG. 27 indicate this ability of the clips to move inwardly to their locked position.

Figure 28:
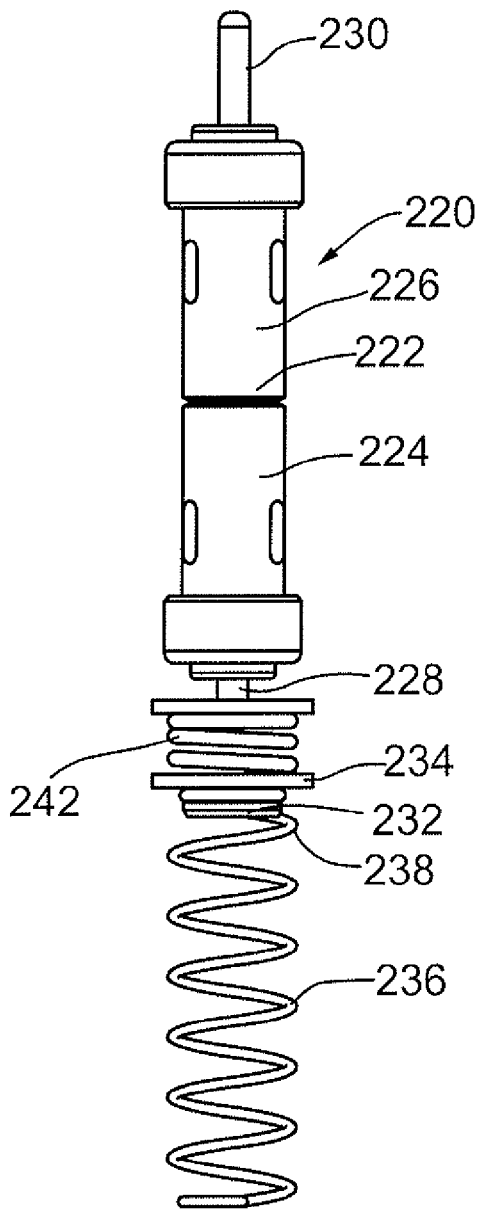
FIG. 28 is a side view of another version of a valve assembly with the closed ends of two actuators attached.
Figure 29:
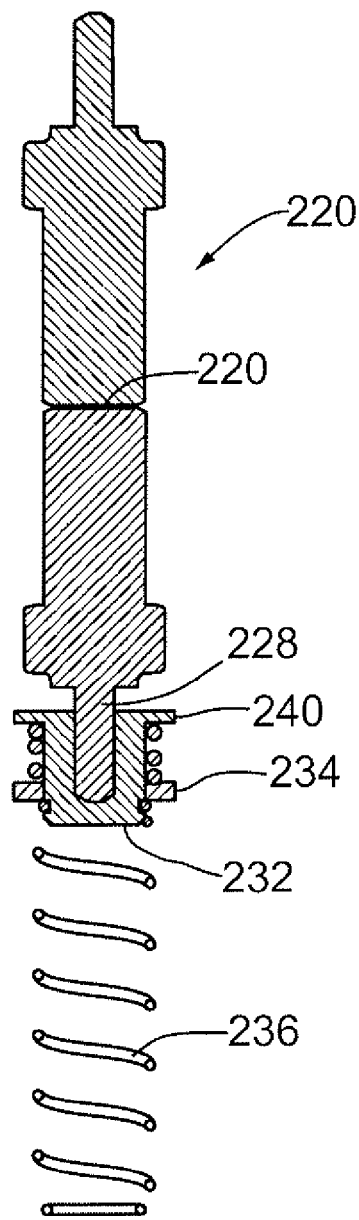
FIG. 29 is a cross-sectional view taken along the line XXIX-XXIX of FIG. 28.

Turning to the valve assembly configuration illustrated in FIGS. 28 and 29, this assembly is indicated generally at 220. In this configuration the closed ends 222 of the two actuators are attached to each other in a rigid manner, for example by gluing with a suitable adhesive. Again the first actuator 224 is axially aligned with the second actuator 226 in an end-to-end manner. The first actuator has a movable piston 228 that extends from the bottom end of the actuator as seen in FIG. 28. The second actuator has a second movable piston 230 which extends from the top end of the actuator. The piston 230 of the second actuator 226 engages a valve cap portion of the valve enclosure (as in the embodiment of FIGS. 1 to 3).

The valve assembly 220 includes a substantially cylindrical valve support member 232 fixedly mounted on the piston 228 of the first actuator and having a central axis which is co-axial with the central longitudinal axis of the piston 228. An annular valve member 234 is mounted on the valve support member for relative movement in the direction of the central axis. This assembly includes a return spring mechanism 236 in the form of a coil spring which is adapted to bias one of the actuators to a position where its respective piston is retracted. In this embodiment, the return spring has one end 238 engaging the valve support member 232 at its bottom end. The end of the return spring helps to hold the valve member on the support member 232. The support member is formed with an annular end flange 240. A further coil spring is provided which has one end engaging the valve member 234 and which biases this valve member towards the closed position where the valve member engages its valve seat. The opposite end of the spring 242 engages and is supported by the annular flange 240. The support member 232 can be attached to the piston either by threads (not shown) or by a secure press fit.

FIGS. 30 and 31 illustrate another embodiment of a valve assembly 250 wherein the two actuators are connected to each other at their closed ends 222. This valve assembly is similar to the embodiment of FIGS. 28 and 29 except for the differences noted hereinafter. This embodiment has a different form of valve member 252 which is rigidly mounted on the piston 228 of the first actuator. The valve member is formed with an annular end flange at 254. One end of the return spring 256 is connected to an end section of the valve member. A further coil spring 260 has a first spring end 262 engaging one end (in this case the upper end as shown) of the valve member and it also has a second spring end 264 engaging an end of the actuator body of the first actuator 224. The further spring 260 biases the valve member 252 towards its closed position where the valve member engages the valve seat (forming the bypass port 36).

Figure 32:
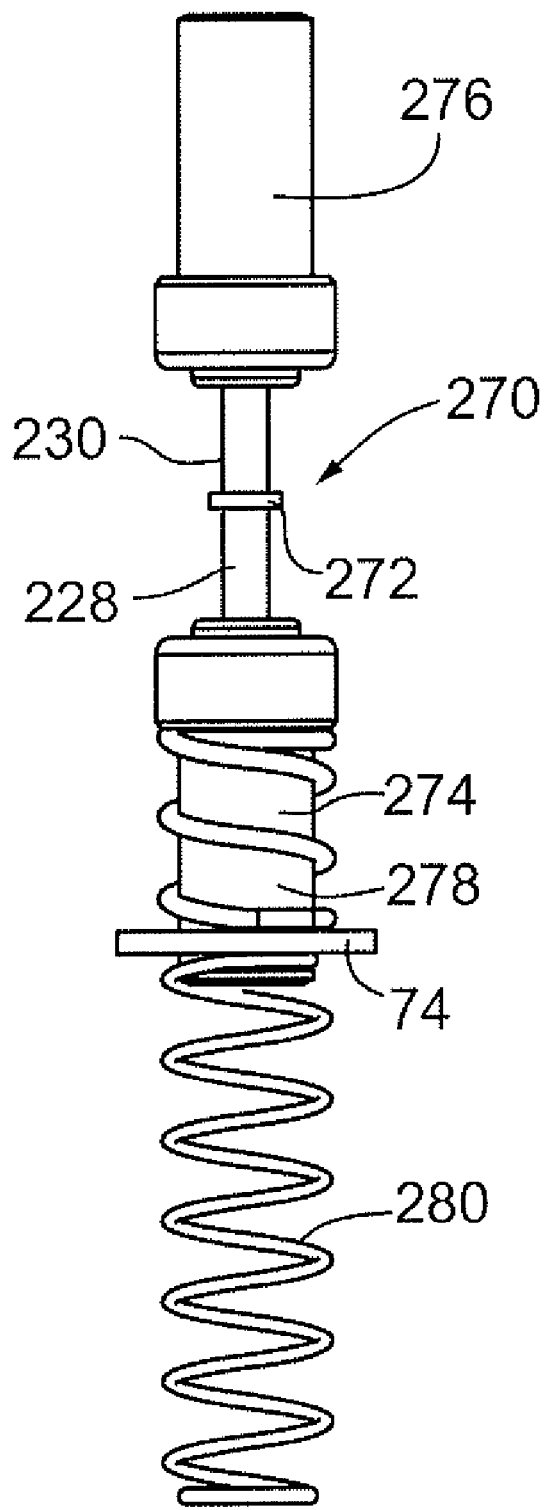
FIG. 32 is a side view of still another version of a valve assembly with the pistons of the two actuators attached.

FIG. 32 illustrates still another valve assembly 270 wherein the pistons 230, 228 are connected to each other, for example by means of a connecting ring 272. The ring 272 can be internally threaded to engage threads formed on the ends of the pistons. Except for the orientation of and connection of the pistons, this valve assembly can operate in a manner similar to that shown in FIGS. 1 to 3 and described above. Thus this embodiment also has a first thermally sensitive actuator 274 and a second such actuator 276 which are axially aligned. The first actuator has an actuator body 278 on which is mounted for axial movement an annular valve member 74. This bypass valve member is normally movable by one of the two actuators from a first position where the bypass port is in an open state to a closed position where the bypass port is closed by the valve member engaging a valve seat. The valve assembly 270 includes a return spring mechanism 280 which again is a coil spring. One end of the return spring engages a closed end section of the first actuator 274 and acts to hold the valve member on the actuator body. The return spring has an opposite end which engages a spring seat (for example in the manner described above in connection with FIGS. 1 to 3).

By way of further explanation of the construction of the valve chamber of the present bypass valve, one can consider this chamber divided into a primary section 190 and a secondary section 192 by the bypass port 36. When the valve chamber is considered in this manner, both of the actuators 60, 62 are located in the primary section (at least to a substantial extent). The first port 24 and the third port 28 are connected to the secondary section of the chamber and the second port 26 and fourth port 30 are connected to the primary section 190. The heat exchanger 12 has an inlet at 200 for flow of the heat exchange fluid into the heat exchanger or heat exchanger component. Also this component has an outlet 202 for the flow of the heat exchange fluid from the heat exchanger component 12. Thus the primary chamber section of the bypass valve is operably connected to the outlet 202 and the secondary chamber section 192 is operably connected to the inlet 200.

In an exemplary version of the thermal bypass valve the first piston is extended by the first actuator 60 at a pre-determined temperature which is at least 80° Celsius during use of the bypass valve and the second actuator is adapted to extend its piston 70 at a selected higher temperature which is less than 95° Celsius. In one particular embodiment the first actuator 60 is constructed to extend its piston at a temperature of about 80° Celsius and the second actuator is constructed to extend its piston at a temperature of about 90° Celsius. It will thus be understood that with this embodiment, if the first actuator fails to operate when the heat exchange fluid reaches 80 degrees Celsius and the heat exchange fluid then reaches a temperature of 90 degrees Celsius, the second actuator 62 will stroke and will then be locked in the position to which it has been moved by its piston.

It will be further appreciated by those skilled in the construction of thermal bypass valves that it is quite possible to construct the present bypass valve so that in event of failure of the first actuator and extension of the second actuator, the valve will be locked in either a bypass open position or a bypass closed position, the selected construction being dependent upon what position is required for the particular component that is connected to the bypass valve and that is to be protected by the valve. Although the particular thermal bypass valve illustrated in FIGS. 1 to 3 is constructed so that it will be locked in a closed position where the valve member engages the valve seat 38 and prevents any bypass flow of the heat exchange fluid, it will be apparent that a similar construction using two axially aligned first and second thermally sensitive actuators can be used so that, in the event of failure of one of the actuators, the valve member is held in an open position away from the valve seat so that it will continue to allow bypass flow.

While the present invention has been illustrated and described as embodied in exemplary embodiments, i.e. embodiments having particular utility as a thermal bypass valve, it is to be understood that the present invention is not limited to the details shown herein since it will be understood that various omissions, modifications, substitutions and changes in the forms and details of the disclosed heat exchange system and thermal bypass valve and their operation may be made by those skilled in the art without departing in any way from the spirit and scope of the present invention.

I claim:

1. A thermal bypass valve for a heat exchanger circuit, comprising:
   a valve housing forming a valve chamber including a bypass passage and having a first port for flow of a heat exchange fluid into said valve chamber, a second port for flow of said heat exchange fluid out of said valve chamber, a third port for flow of said heat exchange fluid from said valve chamber to a heat exchanger, a fourth port for flow of said heat exchange fluid from said heat exchanger to said valve chamber, and a bypass port defined by a valve seat provided in said housing;
   axially aligned first and second thermally sensitive actuators mounted in said chamber, connected to one another, and having respective first and second actuator bodies and respective first and second movable pistons, each extendible from one end of its respective actuator body, at least one of said actuator bodies being normally movable in the valve chamber in response to extension of its piston, one of said actuators being adapted to extend its piston at a selected higher temperature than a predetermined temperature required for the other actuator to extend its respective piston;
   a valve member mounted on one of said first and second actuators which is adjacent said valve seat and movable by either the first or the second actuator from a first position, where said bypass port is in an open state, to a closed position where said bypass port is closed by said valve member engaging said valve seat; and
   a return spring mechanism mounted in said housing and adapted to bias an adjacent one of said actuators away from the valve seat,
   wherein the bias of the return spring mechanism can be overcome during use of the bypass valve by extension of either said first piston or said second piston depending on the temperature to which the actuator bodies are heated.

2. A thermal bypass valve according to claim 1 wherein said valve member is an annular valve disk movably mounted on said first actuator body and said first piston is connected to an end of the second actuator body remote from the second piston.

3. A thermal bypass valve according to claim 2 wherein said valve housing includes a cap member sealingly closed one end of said valve chamber and said second piston engages said cap member.

4. A thermal bypass valve according to claim 3 wherein said valve chamber is divided into primary and secondary sections by said bypass port and valve seat, both of said actuators are located in said primary section, said first and third ports are connected to said secondary section and said second and fourth ports are connected to said primary section, and valve means for forward flow pressure relief are mounted in said valve chamber, said valve means including at least one relief port adjacent said bypass port and at least one relief valve member biased to a closed position where said at least one relief port is closed by the at least one relief valve member, and wherein, in event of a predetermined excessive pressure build-up in said primary section, said at least one relief valve member moves away from said at least one relief port to an open position thereby reducing the pressure build-up by allowing the heat exchange fluid to flow into the secondary section.

5. A thermal bypass valve according to claim 4 wherein said valve seat and said at least one relief port are provided by a separate spring enclosure mounted in said valve chamber and having a substantially annular top section forming said valve seat and said at least one relief port and integral supporting legs extending from said top section into the secondary section of the chamber, and wherein said return spring is located centrally in the spring enclosure.

6. A thermal bypass valve according to claim 5 wherein said valve means includes a coil spring extending around and coaxial with said return spring and mounted in said spring enclosure, said coil spring biasing said at least one relief valve member to its closed position.

7. A thermal bypass valve according to claim 2 wherein said first piston is extended by the first actuator at the predetermined temperature which is at least 80° Celsius during use of the bypass valve and said second actuator is adapted to extend said second piston at said selected higher temperature which is less than 95° Celsius.

8. A thermal bypass valve according to claim 1 including a locking mechanism mounted in said valve housing and adapted to engage and hold said one actuator whose piston extends at said selected higher temperature, wherein said locking mechanism moves from an unlocked position to a locked position where the locking mechanism engages and holds the actuator body of the one actuator after this actuator body is moved by its respective piston.

9. A thermal bypass valve according to claim 8 wherein said locking mechanism comprises at least one resilient, movable locking clip mounted in said valve housing and held in said unlocked position by said actuator body of the one actuator when its respective piston has not been extended.

10. A thermal bypass valve according to claim 1 wherein one of said pistons is connected to the actuator body associated with the other piston at an end of the actuator body remote from the other piston and each of the actuator bodies is movable in the valve chamber in response to extension of its respective piston.

11. A heat exchanger system for heating or cooling a heat exchange fluid, said system comprising:
 a heat exchanger component adapted to heat or cool said heat exchange fluid and including an inlet for flow of the heat exchange fluid into said component and an outlet for flow of the heat exchange fluid from said component;
 a thermal bypass valve component including a valve chamber divided into primary and secondary chamber sections by a bypass valve port defined by a valve seat, said primary chamber section being operatively connected to said outlet and said secondary chamber section being operatively connected to said inlet, said primary chamber section having an outlet for flow of said heat exchange fluid and said secondary chamber section having an inlet for flow of said heat exchanger fluid, said bypass valve component further including axially aligned first and second thermally sensitive actuators mounted in said primary chamber so as to define a first axis, connected to each other, and having respective first and second actuator bodies and first and second pistons each extendible from one end of its respective actuator body, at least one of said actuator bodies being movable in the valve chamber along said first axis in response to extension of its respective piston, one of said actuators being adapted to extend its piston at a selected temperature different than a predetermined temperature required for the other actuator to extend its respective piston;
 a valve member mounted in said valve chamber and capable of moving from an open position where said bypass valve port is open to a closed position where said valve member engages said valve seat and said bypass valve port is closed, said valve member being movable between its open and closed positions by extension of either of said first and second pistons from their respective actuator body; and
 a return spring mechanism mounted in said housing and adapted to bias an adjacent one of the actuators to a position where its respective piston is retracted, the bias of the return spring being normally overcome during use of the heat exchanger system by extension of said respective piston due to the temperature of said one actuator.

12. A heat exchanger system according to claim 11 wherein said valve member is an annular valve disk movably mounted on said first actuator body and said valve member is biased towards the closed position by a spring mounted on said first actuator body.

13. A heat exchanger system according to claim 12 wherein said bypass valve component includes a valve housing forming said valve chamber and a locking mechanism is mounted in said valve chamber, is connected to said valve housing, and is adapted to engage and hold one of said actuator bodies upon extension of its respective piston whereby said valve member is maintained in its existing open or closed position.

14. A heat exchanger system according to claim 13 wherein said locking mechanism comprises at least two resilient lock members movably mounted on a valve cap portion of said valve housing and held in an unlocked position by said one actuator body prior to extension of its respective piston.

15. A heat exchanger system according to claim 11 including a relief valve for forward flow pressure relief located in said valve chamber, said relief valve having at least one relief port adjacent said bypass valve port and at least one relief valve member biased to a closed position where said at least one relief port is closed by said at least one relief valve member, wherein, in event of a predetermined excessive pressure build-up in said primary chamber section, said at least one relief valve member moves away from said at least one relief port to an open position, thereby reducing the pressure build-up by allowing the heat exchange fluid to flow into said secondary chamber section.

16. A heat exchanger system according to claim 15 wherein said valve seat and said at least one relief port are provided by a separate spring enclosure mounted in said valve chamber and having a substantially annular top section forming said valve seat and said at least one relief port and integral supporting legs extending from said top section into the secondary section of the chamber, and wherein said return spring is located centrally in the spring enclosure.

17. A thermal bypass valve for a heat exchanger circuit, comprising:
 a bypass valve enclosure forming a valve chamber, a valve seat defining a bypass valve port, and passage means for flow of a heat exchange fluid through said bypass valve port into said valve chamber, said valve enclosure having a first port for flow of said heat exchange fluid into said passage means, a second port for flow of said heat exchange fluid out of said valve chamber, a third port for flow of said heat exchange fluid from said passage means to a heat exchanger, and a fourth port for flow of said heat exchange fluid from said heat exchanger into said valve chamber;

first and second thermally sensitive actuators mounted in said valve chamber and each having an actuator body and a piston extendible from one end of the actuator body, the actuators being connected to each other and aligned with each other in an end-to-end manner, one of said actuators being adapted to extend its piston at a selected temperature different than a predetermined temperature required for the other actuator to extend its respective piston;

a valve mechanism mounted in said valve chamber and capable of moving from an open position where said bypass valve port is open to a closed position where said valve mechanism engages said valve seat and said bypass valve port is closed, said valve mechanism being movable between its open and closed positions by extension of either of said pistons from its respective actuator body; and a return spring mechanism mounted in said housing and adapted to bias one of the actuators to a position where its respective piston is retracted, the bias of the return spring being normally overcome during use of the heat exchanger system by extension of said respective piston due to the temperature of said one actuator.

18. A thermal bypass valve according to claim 17 wherein said valve mechanism includes an annular valve member and a coil spring engaging said valve member at one end of the spring and biasing said valve member towards said closed position where said valve member engages said valve seat.

19. A thermal bypass valve according to claim 17 including a resilient, movable locking mechanism mounted in said valve chamber, connected to said valve enclosure, and adapted to move into locking engagement with one of said actuator bodies upon extension of its respective piston whereby said valve member is maintained in its existing position.

20. A thermal bypass valve according to claim 17 including relief valve means having at least one relief port adjacent said bypass valve port and at least one relief valve member biased to a closed position where said at least one relief port is closed, wherein, in event of a predetermined excessive pressure build-up in said valve chamber, said at least one relief valve member moves to an open position, thereby reducing the pressure build-up.

21. A thermal bypass valve according to claim 20 wherein said valve seat and said at least one relief port are provided by a separate spring enclosure mounted in said valve chamber and having a substantially annular top section forming said valve seat and said at least one relief port and integral supporting legs extending from said top section into said passage means, and wherein said return spring mechanism is located centrally in the spring enclosure.

22. A thermal bypass valve according to claim 17 wherein the piston of the first actuator engages an adjacent end of the second actuator and is connected thereto and the piston of the second actuator engages a valve cap portion of said valve enclosure, said valve cap portion forming one end of the valve chamber.

23. A thermal bypass valve according to claim 17 wherein each actuator body has a closed end located away from its respective piston, the closed ends of the two actuators are connected to each other, and the piston of said second actuator engages a valve cap portion of the valve enclosure which forms one end of the valve chamber; and said valve mechanism includes a substantially cylindrical valve support member fixedly mounted on the piston of the first actuator and having a central axis, an annular valve member mounted on said valve support member for relative movement in the direction of said central axis, and a further spring having one end engaging said valve member and biasing said valve member towards said closed position where said valve member engages said valve seat.

24. A thermal bypass valve according to claim 23 wherein said return spring mechanism is a return coil spring having one end engaging said valve support member, which is formed with an annular flange, and said further spring has an opposite end engaging and supported by said annular flange.

25. A thermal bypass valve according to claim 17 wherein each actuator body has a closed end located away from its respective piston, the closed ends of the two actuators are connected to each other, and the piston of said second actuator engages a valve cap portion of the valve enclosure which forms one end of the valve chamber; and said valve mechanism includes a substantially cylindrical valve member rigidly mounted on the piston of the first actuator and a further spring having a first spring end engaging said valve member and a second spring end engaging an end of the actuator body of the first actuator, said further spring biasing said valve member towards said closed position where said valve member engages said valve seat.

* * * * *